(12) United States Patent
Owen

(10) Patent No.: US 7,666,364 B2
(45) Date of Patent: Feb. 23, 2010

(54) FCC CLOSED CYCLONE WITH SNORKEL

(76) Inventor: Hartley Owen, 24214 Kinnards Point Dr., Worton, MD (US) 21678

( * ) Notice: Subject to any disclaimer, the term of this patent is extended or adjusted under 35 U.S.C. 154(b) by 0 days.

(21) Appl. No.: 12/074,333

(22) Filed: Mar. 3, 2008

(65) Prior Publication Data
US 2008/0152550 A1   Jun. 26, 2008

Related U.S. Application Data

(62) Division of application No. 10/621,197, filed on Jul. 16, 2003, now Pat. No. 7,351,326.

(60) Provisional application No. 60/397,797, filed on Jul. 23, 2002.

(51) Int. Cl.
*F27B 15/08* (2006.01)
*F27B 15/00* (2006.01)
*B01D 51/00* (2006.01)
*B01D 45/12* (2006.01)

(52) U.S. Cl. .................. 422/147; 422/139; 422/144; 422/145; 96/372; 96/378; 55/345; 55/349; 55/459.1

(58) Field of Classification Search .............. 422/139, 422/144, 145, 147; 208/89, 113, 150; 96/372, 96/378; 55/345, 349, 459.1
See application file for complete search history.

(56) References Cited

U.S. PATENT DOCUMENTS

| | | | | |
|---|---|---|---|---|
| 4,946,656 A | * | 8/1990 | Ross et al. | 422/144 |
| 5,039,397 A | * | 8/1991 | Haddad et al. | 208/161 |
| 5,279,727 A | * | 1/1994 | Helstrom et al. | 208/161 |
| 5,391,289 A | * | 2/1995 | Forde et al. | 208/113 |
| 5,518,695 A | * | 5/1996 | Goodspeed et al. | 422/144 |
| 5,681,450 A | * | 10/1997 | Chitnis et al. | 208/113 |
| 7,179,428 B2 | * | 2/2007 | Dries | 422/144 |

* cited by examiner

Primary Examiner—Walter D Griffin
Assistant Examiner—Huy-Tram Nguyen
(74) Attorney, Agent, or Firm—Richard D. Stone

(57) ABSTRACT

Thermal cracking in a riser cracking, closed cyclone, fluidized catalytic cracking process is reduced. A snorkel or flow conduit having an inlet just above the catalyst stripper moves stripper vapor into the closed cyclone. The system preferably operates without a stripper cap, relying on fluid dynamics to isolate stripper vapor from upper parts of the vessel containing the riser outlet. Preferably the snorkel is at least partially supported by, and ideally is inside, the primary cyclone dipleg. Reduced residence time of stripper vapor in the vessel containing the stripper and the closed cyclone system reduces thermal cracking of stripper vapor.

9 Claims, 3 Drawing Sheets

FCC CLOSED CYCLONE WITH SNORKEL

CROSS REFERENCE TO RELATED APPLICATIONS

This application is a division of my prior application 10/621,197 filed Jul. 16, 2003, now U.S. Pat. No. 7,351,326, which is incorporated by reference, and claims the benefit of my prior provisional application 60/397,797 filed on Jul. 23, 2002.

FIELD OF THE INVENTION

This invention relates to fluid catalytic cracking and more particularly to a closed cyclone system for separating cracked hydrocarbons from spent cracking catalyst discharged from a riser reactor.

BACKGROUND OF THE INVENTION

The fluid catalytic cracking (FCC) process has become well-established in the petroleum refining industry for converting higher boiling petroleum fractions into lower boiling products, especially gasoline.

In the FCC process, a finely divided solid cracking catalyst promotes cracking reactions. The catalyst is in a finely divided form, typical particle size of 20-100 microns with an average of about 60-75 microns. The catalyst acts like a fluid (hence the designation FCC) and circulates in a closed cycle between a cracking zone and a separate regeneration zone.

In the cracking zone, hot catalyst contacts the feed so as to effect the desired cracking reactions and coke up the catalyst. The catalyst is then separated from cracked products which are removed from the cracking reactor for further processing. The coked catalyst is stripped and then regenerated. A good overview of the importance of the FCC process, and its continuous improvement, is reported in Fluid Catalytic Cracking Report, Amos A. Avidan, Michael Edwards and Hartley Owen, in the Jan. 8, 1990 Oil & Gas Journal.

One of the most significant problems remaining is post-riser cracking. As FCC technology has improved, post riser cracking has gone from a trivial problem which was hard to find in a commercial unit to a major problem which can not be ignored.

The problem could be largely ignored when the FCC unit operated with a riser top temperature of 950° F. As catalysts became more active, and feeds heavier, riser top temperatures increased above 1,000° F. in many units. The large volume "reactor"—in which the riser reactor discharged—became a thermal cracker. Large amounts of cracked product vapor spent a significant amount of time in the vapor space above the FCC stripper, and time and high temperature predictably produced thermal cracking.

More details about the problem and the state of the art methods of minimizing such thermal cracking, are presented in FCC CLOSED CYCLONE SYSTEM ELIMINATES POST-RISER CRACKING, by Amos A. Avidan, Frederick J. Krambec, Hartley Owen, and Paul H. Schipper, presented at the 1990 NPRA Annual Meeting, Mar. 25-27, 1990.

The authors, one of whom is the present inventor, reported the dramatic decrease in thermal cracking which could be achieved using a "closed-cyclone" system to separate cracked products from spent catalyst as they are discharged from the FCC riser reactor. The paper reviewed various "rough cut" separation devices (in U.S. Pat. No. 4,295,961 and U.S. Pat. No. 4,664,888 and U.S. Pat. No. 4,721,603, which are incorporated by reference). While they are improvements over dense bed cracking units or riser cracking units with no cyclones, the rough cut devices merely separated spent catalyst from spent products. The rough cut cyclones still allowed a significant amount of hydrocarbons to remain a long time in the reactor vessel, the volume above the stripper.

The authors presented a new type of riser reactor cyclone, a "closed cyclone" which effectively separated cracked products from spent catalyst and quickly removed the cracked products from the reactor vessel. Closed cyclone designs are reported in U.S. Pat. No. 5,055,177, Haddad et al. This design, and the closed cyclone designs of other oil companies, generally did an excellent job of quickly removing from the vessel the cracked vapors recovered via the riser cyclones. This design ignored another problem, thermal cracking of stripper vapor.

A significant amount of the cracked vapor product stays with, or is entrained in, or is needed to fluidize, the spent catalyst. Those working in this field concentrated their efforts on the primary product vapor stream, the 90+ mole % of the cracked vapor recovered as a vapor phase out of the reactor vessel. They generally ignored the secondary vapor product, the modest amount of vapor product discharged with the spent catalyst from the reactor cyclone systems. This vapor product, plus additional hydrocarbons displaced or desorbed from the spent catalyst by steam stripping, was at a temperature approaching that of the riser reactor. Although small in size, the secondary product could crack thermally, and was severely over-cracked even as the primary product was removed relatively unscathed due to thermal cracking.

Thermal cracking depends on time and temperature. The net effect of getting most of the vapor out quickly (to practically eliminate thermal cracking of this material) was significantly offset by large amounts of thermal cracking of the secondary vapor product in the reactor volume above the stripper.

An order of magnitude less hydrocarbon was discharged down the riser cyclone diplegs to be recovered with stripper vapors. The reactor volume stayed the same, so as closed cyclone efficiency increased, the stripper vapor residence time increased dramatically.

Refiners reported dramatic yield benefits. The Avidan et al paper presented at the 1990 NPRA meeting reported a reduction of 40 percent in sulfur-free dry gas make. This was a significant and noteworthy accomplishment, but was actually a combination of two phenomena—an even more dramatic reduction in dry gas make in the primary product and an offsetting significant increase in thermal cracking and attendant dry gas production in the secondary, or stripper vapor product.

Another benefit of closed cyclones reported in this paper was that the production of butadiene is reduced by over 50 percent. Butadiene is a sensitive measure of thermal cracking in FCC, refiners watch it because it is a major contributor to acid consumption in downstream alkylation units.

I wanted to retain the benefits of closed cyclone FCC riser cracking, but avoid the excessive thermal cracking which occurred in the reactor volume. My goal could also be considered as a way to help solve a long standing problem, post riser thermal cracking in the vessel volume above the FCC stripper.

Four approaches have been proposed or used to reduce thermal cracking in this area: dome steam, riser quench, post-riser steam quench and a stripper cap/snorkel. To me all these are related and are attempts to reduce thermal cracking in a catalytic cracking unit. Each approach has benefits and burdens, and each is reviewed below.

Dome Steam

Refiners have known for years that thermal cracking went on in the "reactor volume" above the stripper. Thus in addition to the four kinds of coke make associated with FCC (catalytic, CCR, Pt function, and cat/oil), refiners have known about "dome coke"—a product of undesired thermal cracking in the dome of the reactor vessel, or the vessel holding the stripper. Unless this part of the vessel is continuously purged with steam, the relatively stagnant region allows thermal cracking to proceed unabated, which produces large coke deposits which can grow in size, break off, and damage vessel internals. Refiners now add 500 to 1000 #/hour of steam directly to the dome volume. This purge steam sweeps hydrocarbons out of the dome region. Refiners have practiced this for decades, but it is so well accepted and universally practiced that it is rarely discussed. I mention it to show that refiners are well aware of the problem of thermal cracking in the vessel volume.

While use of dome steam has been practiced for decades, another attempt at suppressing thermal cracking was commercialized in recent years—riser quench.

Riser Quench

Refiners have known that higher riser temperatures are beneficial in cracking heavy feeds in a short time. They have also known that higher temperatures in the riser lead to undesired thermal cracking downstream of the riser in the reactor vessel. A way to have higher temperatures in the riser than in the reactor vessel is to use riser quench. Several approaches to quench have been developed, as reported in U.S. Pat. No. 4,818,372, Mauleon et al and U.S. Pat. No. 5,389,232, Adewuyi et al, which are incorporated by reference. Basically riser quench involves cracking the feed in the base of the riser at a higher than normal temperature and injecting a cooler material, such as light cycle oil, higher up in the riser.

Some refiners quench quickly, within less than a second of residence time in the riser, while some quench higher up or even at the riser outlet. This will reduce post-riser thermal cracking. A somewhat related approach is post-riser quenching, discussed next.

Post-Riser Quenching

U.S. Pat. No. 4,978,440, Krambeck, Dec. 18, 1990, taught injecting water or steam downstream of the FCC riser. This patent is incorporated by reference.

The patentee recognized that thermal cracking occurred in the reactor vessel. Closed cyclone operation increased the residence time of the stripper vapor. The solution, adding steam to reduce the temperature in the vapor phase above the stripper, reduced thermal cracking. It also required adding a large amount of steam to the FCC unit, and this steam tied up a significant portion of the plant volume with water vapor.

Stripper Cap

A fourth approach was isolation of the stripper, a stripper cap and snorkel, as disclosed in U.S. Pat. No. 4,946,656, VENTED STRIPPER SECTION FOR A FLUID CATALYTIC CRACKING UNIT APPARATUS, which is incorporated by reference. They proposed to isolate the stripper from the interior volume of the vessel 1 with a stripper cap 40. This vessel contained the outlet of the riser reactor, the closed cyclone separation system, and the catalyst stripper. The stripper cap was a slant tray, the slope ensured that catalyst falling on the cap would eventually fall down into the stripper. The isolated stripper vapors were removed from the under the stripper cap via a "chimney vent" line 30 passing through holes 29 in the stripper cap. The vent line tied in with the vapor line from the primary cyclone 5 to the secondary cyclone 9.

The patentees recognized the problem—thermal cracking of stripper vapor in closed cyclone FCC operation. Their solution, if implemented, would partially solve the thermal cracking problem while creating other problems.

Their solution would efficiently remove much of the stripper vapor and reduce—but not eliminate—thermal cracking of stripper vapor in the vessel 1. Thus it was at least a partial solution to the problem, with the part left unsolved being the undesired thermal cracking of stripper vapor which would pass through the holes in the cap to the interior of vessel to eventually leave via an annulus in the upper part of vessel 1.

Implementing this solution in commercial FCC units would cause some problems. First the construction and servicing of the unit are greatly complicated by the addition of stripper cap 40. It physically isolates the stripper from everything else, making it harder to inspect, work on, or repair internal stripper hardware. Second, the cap has to be mechanically strong. If any part of it falls off the operation of the catalyst stripper will suffer greatly. The cap has to be segmented, so that it can be fit through man-ways providing access to vessel 1. The cap will generally be installed around the cyclone diplegs and the riser reactor, so a complex field fabrication procedure will be required.

The support of chimney vent 30 causes significant problems, at least in the embodiment shown in the patent. The vapor inlet to the secondary cyclone, line 23, is supported entirely by the secondary cyclone. This line in turn supports stripper vent 30, while a portion of line 23 must fit loosely over the primary cyclone vapor outlet, line 21. A loose fit is necessary because the stripper cap has so many holes in it that a significant amount of stripper vapor will make its way through the reactor vessel volume and pass through annulus 27.

The mechanical design of such a system is complex and costly. The system must accommodate a significant amount of thermal expansion. Just as the SR71 Blackbird is reported to grow in length almost a foot, as it heats up during supersonic flight, an FCC riser gets longer as it heats up. The riser heats up first, followed by the cyclones, so they do not expand simultaneously. In addition to thermal stress, the FCC riser can bump and even shake at times if something goes off on cat/oil ratio or steam addition in some part of the unit.

An additional concern with the vent cap design shown is possible formation of dome coke, or perhaps "vent cap coke", in stagnant portions of the cap. Even though steam is added in large amounts to the stripper, and apparently to the stripper volume via line 44, the apex regions of the vent cap will be relatively stagnant and difficult to purge with steam. Coke formation is a distinct possibility. Once coke formation starts, it will continue. It is possible to form large pieces of coke which can fall off and impair stripper operation and may even present a safety hazard during turnarounds. It may be possible to design a vent cap purge which would be as effective as dome steam but this is not a trivial problem, as this area is so difficult to reach. If a small steam line is put in it may not be there in a few years (due to erosion), while if a large line is put in there are problems supporting it and connecting it to a "moving target", which will be the case due to thermal expansion.

The most troublesome concern is that the design seems to allow a significant amount of hydrocarbon vapor traffic from the stripper up through the reactor vessel into annulus 27. A significant amount of thermal cracking of this material as it passes through the large void volume of the reactor vessel seems likely. The patentees recognized this, and proposed adding more steam via steam spargers 34 and 36 to speed this material on its way. While this addition will mitigate the damage done to stripper vapor during its passage through the reactor vessel, it seemed more like treating the symptom rather than the disease.

I know how commercial FCC units operate. It is my belief that none achieve the full potential of riser cracking plus closed cyclone operation. Most refiners have been happy to have the benefits of high temperature riser cracking and look on the thermal cracking as a burden of higher riser temperatures.

While quenching, either in the riser or downstream, reduces thermal cracking, significant amounts of quench material are needed. Closed cyclone operation provided the most benefit with the least burden. The benefits of closed cyclones were significant, but the full potential was usually not seen because some of the improvement was masked by the significant increase in thermal cracking of stripper vapor.

I wanted a better way to reduce thermal cracking of stripper vapor in an FCC unit using a closed cyclone system on the riser outlet. I accepted that a stripper was essential for this type of FCC operation, but did not, however, believe this material had to stagnate and crack in the reactor vessel above the stripper. Vapor had to be with the catalyst flowing down the primary cyclone diplegs into the stripper, but this vapor (as well as stripping steam) did not have to pass through the vessel volume above the stripper. All the stripper vapor did in this volume was thermally crack, and I wanted to get it out, but in a way which was compatible with the unit as it stood. I wanted a complete, rather than a partial solution to the problem of thermal cracking of stripper vapor in the reactor vessel.

Refiners wanting to reduce thermal cracking in the reactor void volume had few good options. It was possible to quench, either the entire contents of the riser reactor, or just the stripper vapor, but this had drawbacks. It would be possible to reduce thermal cracking by reducing the reactor volume, but this would involve an exorbitant capital expense. It was possible to use a stripper cap but a difficult and troublesome installation was involved. The stripper cap was a good, approach, but only a partial solution. The cap had holes in it which permitted passage of some stripper vapor through the reactor vessel volume.

I wanted to remove stripper vapor promptly to reduce thermal cracking, but did not want to have to physically isolate the stripper from reactor vessel holding the riser cyclones and riser outlet. I realized it was possible to rapidly and effectively remove stripper vapor from above the stripper using fluid dynamics rather than a cap full of holes to isolate the stripper. The simplest implementation was leave the cap off and simply use a snorkel or vapor flow tube extending from slightly above the stripper to some portion of the closed cyclone system.

Preferably, the cyclones are entirely closed, with no opening into the cyclone system except for the riser outlet and my snorkel. Closing the annular cyclone openings used in the prior art turns flow in the reactor vessel upside down. Instead of hydrocarbons rising in the reactor vessel and being thermally cracked, there is vapor phase down-flow in the reactor vessel. The dome steam, preferably augmented by modest amounts of additional steam, continually forces vapor to flow down through the reactor vessel. Vapor from the riser has only two ways out of the unit—the vast majority leaves rapidly via cyclone vapor outlets while a minority (stripped hydrocarbons and stripping steam) leaves via the snorkel sealingly connected to the vapor line from the primary to the secondary cyclones.

My snorkel's function was somewhat analogous to a snorkel for a submerged submarine, with the snorkel extending just above the surface of the water, supplying air to the diesel engines. My cyclone snorkel extends down, rather than up, but its inlet should terminate just above the surface, the top level of fluidized catalyst in the FCC catalyst stripper.

I even discovered a way to support the snorkel—simply affix it to the dipleg of one or more of the primary cyclones. My snorkel is small, and handles a relatively small stream, a small amount of vapor (relative to the vapor stream discharged from the riser) with a modest amount of entrained catalyst.

Using the cyclone dipleg to support the snorkel allows the snorkel to be placed where it is needed, and supported without significantly adding "torque". There will be little or nor problem due to differential thermal expansion, the temperature of the vapor passing up the snorkel will always be about the same as the temperature of the spent catalyst phase being discharged down the primary cyclone dipleg. Ideally, the snorkel is axially aligned with the cyclone dipleg, and discharges up into the primary cyclone vapor outlet. This will add a modest amount of solids (entrained with the stripper vapor) to the vapor phase discharged from the primary cyclone, but the secondary cyclone is equipped to handle such modest amounts of solids. The snorkel may also be within the primary cyclone dipleg, attached to a sidewall thereof, or even attached to the outside of the primary cyclone dipleg for much or all of its vertical travel.

The closed cyclone snorkel provides a way for most of the stripper vapor to be removed quickly from the reactor, without passing through the large void volume of the vessel containing the riser outlet and the stripper inlet. There will still be some hydrocarbon in the void volume. The void volume will be adequately purged using the existing dome steam injection required to prevent dome coke. If desired, thermal cracking may be even further reduced by increasing the amount of dome steam, to quench to some extent the hydrocarbons present in the reactor void volume, or additional steam may be added at different elevations. I prefer to minimize this type of steam addition, and my process will work with 500 to 5000 lbs/hr of "dome steam."

In addition to discovering a simpler way to isolate stripper vapor from the reactor vessel, I discovered a mechanically superior type of snorkel arrangement which facilitates installation of the device.

BRIEF SUMMARY OF THE INVENTION

Accordingly, the present invention provides a fluidized catalytic cracking process for cracking a crackable hydrocarbon feed by contact with a source of regenerated fluidized cracking catalyst in an enclosed conduit cracking reactor to produce a mixture of cracked hydrocarbon products and spent catalyst containing coke and strippable hydrocarbons and discharging said mixture directly into a closed cyclonic separation means within a vessel; then cyclonically separating said mixture in said separation means into a cracked hydrocarbon product vapor phase with a reduced catalyst content relative to said mixture discharged from said cracking reactor and a spent catalyst phase containing coke and strippable hydrocarbons; discharging said spent catalyst phase down from said cyclonic separation means into a catalyst stripper within said vessel, said stripper having an upper portion with a stripper cross sectional area, said stripper being in open fluid communication with said vessel and at least a majority of said stripper cross sectional area is open to said vessel; stripping said spent catalyst in said catalyst stripping means by maintaining spent catalyst as a dense phase fluidized bed fluidized at least in part by injection of stripping steam into a lower portion of said bed to produce stripper vapor which is discharged up from said dense phase fluidized bed in said stripping means into said vessel, and stripped catalyst which is discharged from said stripping means into a catalyst regenerator; regenerating said stripped catalyst in said catalyst regenerator at catalyst regeneration conditions including contact with an oxygen containing gas and burning coke from said stripped catalyst to produce regenerated catalyst which is recycled to said cracking reactor to crack said feed; and recovering said stripper vapor discharged up from said dense phase fluidized bed in said stripping means via a snorkel comprising a vertically extending transfer conduit having an inlet in said upper portion of said stripper above said dense phase fluidized bed of spent catalyst in said stripper and an outlet connective with said cyclonic separation means.

In another embodiment, the present invention provides a fluid catalytic cracking process comprising cracking a crackable hydrocarbon feed by contact with a source of regenerated fluidized cracking catalyst in an enclosed conduit cracking reactor to produce a mixture of cracked hydrocarbon products and spent catalyst containing coke and strippable hydrocarbons and having a temperature above 1000° F. and sufficiently high to cause thermal cracking of cracked hydrocarbon products and discharging said mixture from said enclosed conduit directly into a closed cyclone separator system comprising primary and secondary cyclone separators within a vessel; cyclonically separating said mixture in said primary cyclone separator into: a cracked product vapor phase comprising at least 90 mole % of said hydrocarbon product vapor discharged from said riser and less than 5 wt % of said spent catalyst discharged from said riser, which is discharged via a primary cyclone vapor outlet connective with an inlet to said secondary cyclone, and a spent catalyst phase comprising at least 95 wt % of said spent catalyst discharged from said riser and less than 10 mole % of said vapor discharged from said riser, which is discharged down via a primary cyclone dipleg into a catalyst stripper in a lower portion of said vessel; cyclonically separating said vapor phase discharged from said primary separator in said secondary cyclone separator into: a cracked hydrocarbon product vapor phase having less than 1 wt % of said spent catalyst discharged from said riser, which is discharged via a secondary cyclone vapor outlet to a line connective with a product fractionator, and a spent catalyst phase, comprising less than 5 wt % of spent catalyst discharged from said riser and less than 2 mole % of vapor discharged from said riser, which is discharged from a secondary cyclone dipleg into said catalyst stripper; stripping in said catalyst stripper spent catalyst discharged from said primary and secondary cyclone diplegs in a dense phase fluidized bed fluidized at least in part by injection of stripping steam to a lower portion of said bed to produce: stripper vapor which is discharged up from said fluidized bed catalyst stripper, and stripped catalyst which is discharged from said catalyst stripper into a catalyst regenerator; regenerating stripped catalyst in said catalyst regenerator at catalyst regeneration conditions including contact with an oxygen containing gas to produce regenerated catalyst which is recycled to said cracking reactor; and transferring from said stripper to said closed cyclones at least a majority of said stripper vapor discharged up from said fluidized bed in said stripper via a snorkel having a lower snorkel inlet above said dense phase of fluidized catalyst in said stripper, an upper snorkel outlet fluidly connected with said cyclone separators, and a vertical transfer conduit section fluidly isolated from said vessel containing said cyclone separators and physically attached to or within at least one of said primary cyclone diplegs.

In an apparatus embodiment, the present invention provides an apparatus for fluidized catalytic cracking of hydrocarbon feed comprising: a reactor vessel, a riser reactor having a base section and an upper section; an inlet in the base of the riser for the heavy feed; an inlet in the base of the riser for a source of hot regenerated catalytic cracking catalyst; an outlet in the upper section of the riser for discharging catalytically cracked products and spent catalyst into said reactor vessel; a closed cyclone separation means within said vessel receiving cracked products and spent catalyst from said riser for separation of cracked products from spent catalyst; a spent catalyst stripper means in a base portion of said reactor vessel beneath said closed cyclone having a spent catalyst inlet for catalyst from said closed cyclone, a stripping gas inlet in a lower portion thereof, a stripper vapor outlet in an upper portion thereof and a stripped catalyst outlet; a stripper vapor transfer conduit having an inlet in open fluid communication with said vessel and an elevation intermediate said cyclonic separation means and said stripper vapor outlet and an outlet sealingly affixed to said cyclone separation means for transfer of stripper vapor to said cyclone separation means; a catalyst regenerator having an inlet for an oxygen containing regeneration gas, an inlet for stripped catalyst from said stripper catalyst outlet, an outlet for flue gas and an outlet for regenerated catalyst for recycle of regenerated catalyst connective with the base of the riser reactor.

DESCRIPTION OF PREFERRED EMBODIMENTS

Figure 1:
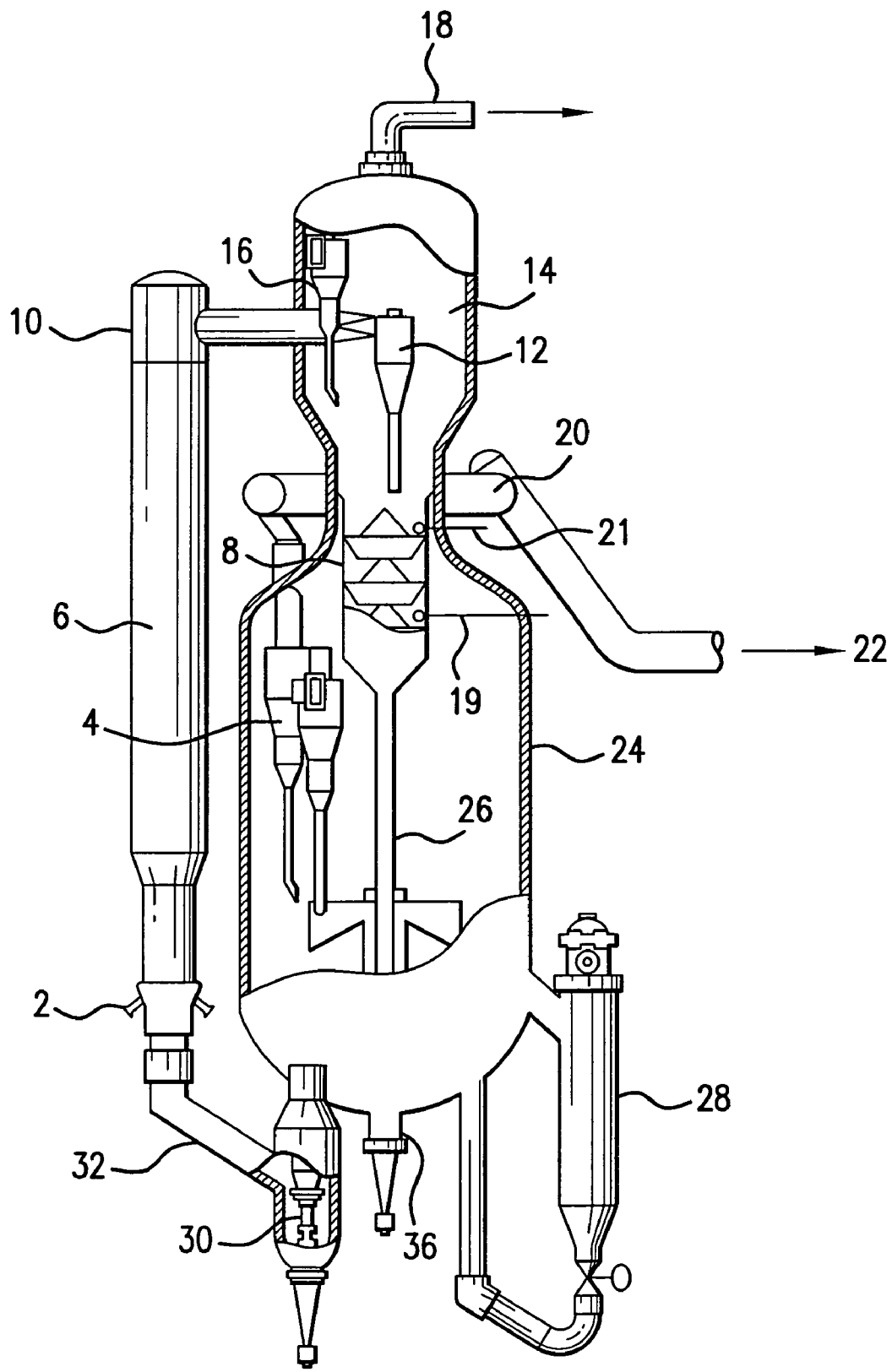
FIG. 1 (prior art) is a schematic view of a conventional fluidized catalytic cracking unit.

FIG. 1 is a simplified schematic view of an FCC unit of the prior art, similar to the Kellogg Ultra Orthoflow converter Model F shown as FIG. 17 of Fluid Catalytic Cracking Report, in the Jan. 8, 1990 edition of Oil & Gas Journal and is identical to FIG. 1 of my U.S. Pat. No. 5,346,610, which is incorporated by reference.

A heavy feed such as a gas oil or vacuum gas oil is added to riser reactor 6 via feed injection nozzles 2. The cracking reaction is completed in the riser reactor, which takes a 90□ turn at the top of the reactor at elbow 10. Spent catalyst and cracked products discharged from the riser reactor pass through riser cyclones 12 which efficiently separate most of the spent catalyst from cracked product. Cracked product is discharged into disengager 14, and eventually is removed via upper cyclones 16 and conduit 18 to the fractionator.

Spent catalyst is discharged down from a dipleg of riser cyclones 12 into catalyst stripper 8, where one, or preferably 2 or more, stages of steam stripping occur, with stripping steam admitted by steam inlet and distributors 19 and 21 at lower and upper levels in the stripper. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so that heat may be removed from the regenerator, if desired. Regenerated catalyst is withdrawn from the regenerator via regenerated catalyst plug valve assembly 30 and discharged via lateral 32 into the base of the riser reactor 6 to contact and crack fresh feed injected via injectors 2, as previously discussed. Flue gas and some entrained catalyst are discharged into a dilute phase region in the upper portion of regenerator 24. Entrained catalyst is separated from flue gas in multiple stages of cyclones 4, and discharged via outlets 8 into plenum 20 for discharge to the flare via line 22.

The FIG. 1 design shows riser cyclones, but not closed cyclones. In a closed cyclone design, the spent catalyst and cracked products discharged from the riser reactor pass through riser cyclones 12 with vapor passed via a pipe or conduit directly to upper cyclones 16. Provisions would be made to admit stripping gas somewhere to the closed cyclone system, preferably by having the vapor outlet from cyclone 12 inserted loosely into the inlet to cyclone 16, so that stripping gasses may pass through the annular opening created by the loose fit.

FIG. 1 shows the conventional approach to FCC riser reactors with closed cyclones. While markedly better than operating without closed cyclones, there is excessive thermal cracking, and diene production, in the reactor volume.

Figure 2:
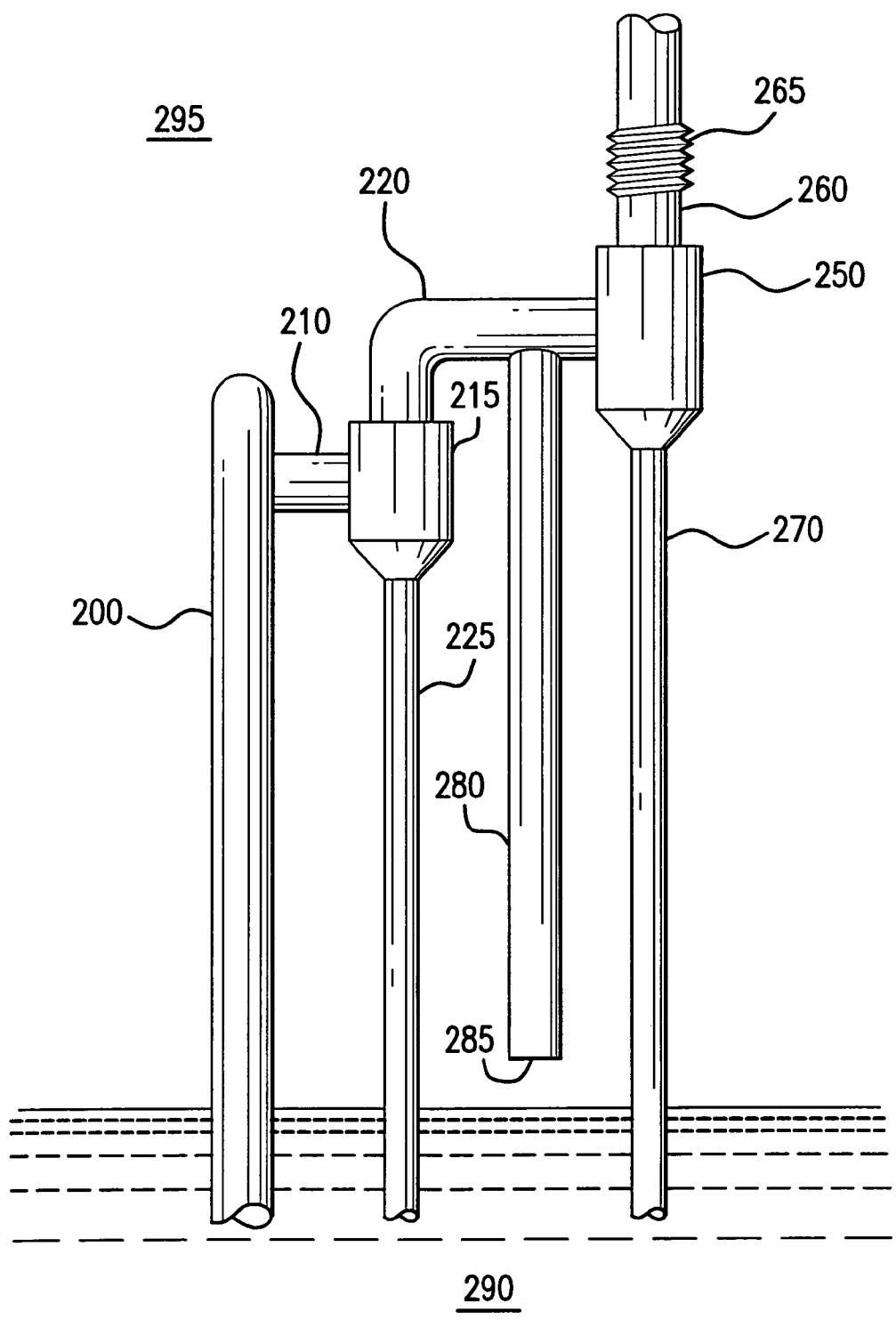
FIG. 2 is a schematic view of one type of snorkel closed cyclone system.

FIG. 2 shows a marked departure from conventional operation. FIG. 2 is a simplified view of part of the device, frequently multiple closed cyclones are used around the riser but only one is shown here.

An FCC riser reactor 200 discharged a mixture of spent catalyst and cracked products via line 210 into primary cyclone 215. A vapor phase with greatly reduced solids content is removed via conduit 220 into secondary cyclone 250. A solids rich phase is discharged from primary cyclone 215 via dipleg 225. This dipleg is sealed at the base by immersion in the upper level of fluidized solids in the stripper, shown as region 290. The cyclone dipleg may also be sealed by a flapper valve.

Gas discharged up from region 290, the stripping steam and stripped hydrocarbons, passes into vapor space region 295 within the reactor vessel, not shown.

Normally stripper vapor has a long trip. In prior art units it has to rise to an elevation where the stripper vapor can exit, either the inlet to the secondary cyclones in an open cyclone system or to the opening for stripping vapors in a closed cyclone system, an opening which is typically at an elevation near or above the reactor cyclones. In my process, the gas takes a short cut, in terms of residence time, by flowing through opening 285 in the base of snorkel 280 connective with line 220.

The flow of stripper vapor in this embodiment is up from region 290, typically 0.2 to 2 meters above the stripper catalyst level, into the snorkel and out of the unit. The reactor vessel remains large, and some beneficial use is made of the large void volume region 295, in providing settling time so that much entrained catalyst exiting the stripper can simply fall back into the stripper.

Catalyst entrainment, or the amount of catalyst per unit volume of stripper vapor, will be higher in my design than in the prior art units because the dilute phase region near the stripper has more catalyst present than the dilute phase region near the top of the reactor void volume. For this reason, I prefer to put snorkel 280 intermediate the primary and secondary cyclones, so that any catalyst which is entrained up the snorkel can be recovered by the secondary cyclone. If desired, snorkel 280 may discharge into a small cyclone (not shown), with the vapor phase from this cyclone passing into line 220 or line 260, or anywhere which permits rapid removal of vapor from the reactor.

The secondary cyclone 250 receives both the vapor phase discharged from the primary cyclone and the vapor/entrained catalyst recovered from the stripper via snorkel 280. The recovered solids are discharged via dipleg 270 into the stripper, with the dipleg sealed by immersion in region 290. The vapor phase is discharged via vapor outlet 260, which passes through an expansion bellows 265 to the transfer line to the FCC main column.

Figure 3:
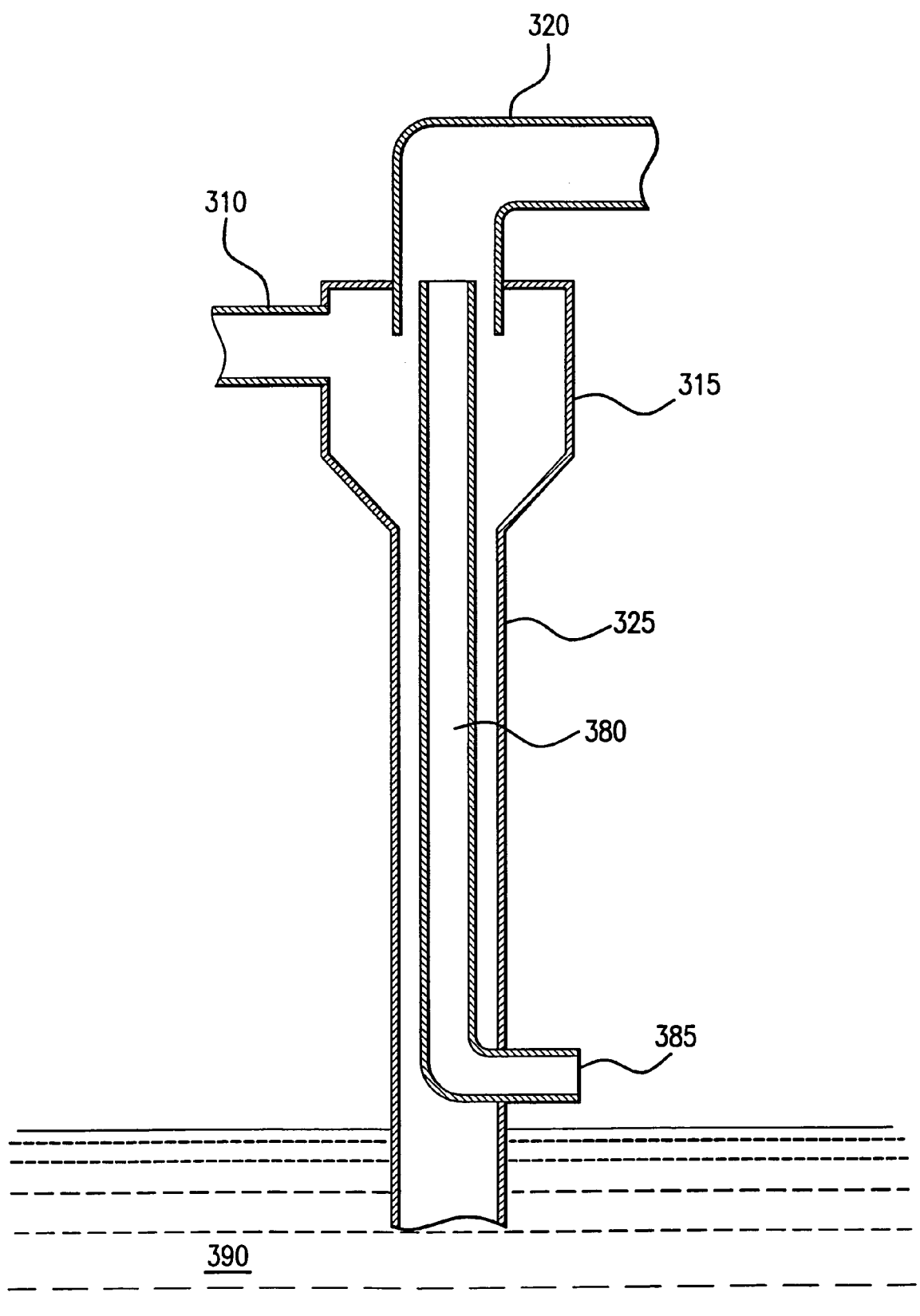
FIG. 3 is a schematic view of a preferred snorkel closed cyclone system.

FIG. 3 shows a preferred embodiment, which is easy to implement in many refinery installations. Only details around the primary cyclone 315 are shown. The primary cyclone receives cracked products and spent catalyst discharged via line 310 from the riser reactor, not shown. Most of the solids are discharged down via dipleg 325, the outlet of which is sealed by immersion in the fluidized bed of catalyst 390 forming the top of the stripper. Stripper vapor enters snorkel 380 via inlet 385. What is unusual about this design is that the snorkel is within and axially aligned with the cyclone dipleg 325. Such a design greatly simplifies field installation of the snorkel, as the snorkel can be fabricated as part of a new dipleg 325 and supported by it.

There may be a slight degradation in performance of the primary cyclone due to the presence of the snorkel in central region, but the secondary cyclone efficiency will usually be high enough to permit installation of the snorkel.

It is beneficial to provide some means, not shown in the figures, to deal with the different rates of thermal expansion of various pieces of equipment. I prefer to put an expansion joint downstream of the second stage cyclone. Use of expansion joints is conventional in FCC units and per se forms no part of the present invention.

Having provided an overview of the cracking process and several preferred snorkel designs, more detailed information will be provided about the different parts of the process and apparatus.

Cracking Catalyst

Conventional cracking catalysts may be used. Practically every FCC unit in the world uses zeolite Y cracking catalyst, and de-aluminized forms of this zeolite such as DEAL Y, USY, and even ultra-hydrophobic Y (UHP-Y) may be used, with or without rare earth stabilization. RE-USY based cracking catalyst will be preferred by many refiners. The catalyst may also contain some shape selective zeolite such as ZSM-5, either as an integral part of the cracking catalyst or as a separate additive.

Catalyst, per se, forms no part of the present invention.

Cracking Conditions

The FCC unit may operate under conventional FCC conditions, including a riser top temperature in the range from about 1000°F to about 1350°F, a Catalyst-to-Oil ratio from about 1:1 to about 20:1, and a contact time of from about 0.1 to about 20 sec. The reactor conditions, per se, form no part of the present invention.

Cracking Feeds

Cracking feeds may be conventional, such as petroleum fractions having an initial boiling point of at least 500°F (260°C), a 50% point at least 750°F (399°C), and an end point of at least 1100°F (593°C). Such fractions include gas oils, vacuum gas oils, thermal oils, residual oils, cycle stocks, whole top crudes, tar sand oils, shale oils, synthetic fuels, heavy hydrocarbon fractions derived from the destructive dehydrogenation of coal, tar, pitches, asphalt, hydro-treated feedstocks derived from any of the foregoing, and the like.

Closed Cyclone System

Any closed cyclone system can be used. Several have been developed, with the primary difference being where stripping vapors enter the closed cyclone system to be mixed with cracked product vapors. One good closed cyclone design is disclosed in my U.S. Pat. No. 4,502,947 and its divisions and continuations including U.S. Pat. No. 5,039,397, which are incorporated by reference. My snorkel works well with this closed cyclone system, but can be used with other closed cyclone designs.

The generic characteristics of a closed cyclone system are:

1. cyclonic separation of cracked products from spent catalysts as the material exits the reactor within a vessel,
2. isolation of the recovered vapor from the interior atmosphere of the vessel, and usually
3. return of stripper vapor to the cyclone separation system.

It is possible to have a closed cyclone system attached to an up-flow riser reactor, a reactor with a horizontal discharge section, or even to a down-flow reactor. So long as the reactor discharges directly into a cyclonic separation device condition #1 is satisfied.

In order for the cyclone system to be "closed" the vapor product from the primary cyclone must be isolated from the vessel atmosphere. Usually this is done by providing lines or conduits which physically isolate the vapor discharged from the primary (and secondary) cyclone(s) from the reactor vessel atmosphere as vapor passes from the cyclones via the transfer line to the FCC main column.

Condition #3 calls for mixing the stripper vapor with the vapor charged to the main column. I want to retain the simplicity and efficiency of combining stripper vapor and the bulk of the cracked vapor products discharged from the reactor. Although these must eventually be combined on their way to the main column, there are several ways to do this.

Preferably this is done as shown in FIGS. 2 and 3, adding stripper vapor to the vapor line connecting the primary and secondary cyclones or into the primary cyclone near the vapor outlet. This provides the best combination of pressure balance and simplicity.

It is also possible to send the stripper vapor to the inlet side of the primary cyclone. This can be done with brute force by using a blower or steam aspiration to provide motive force to get the stripper vapor into the cyclone inlet, or by using a long dipleg to discharge solids from the primary cyclone. This allows the primary cyclone to run as a negative pressure cyclone so that gas will flow into it from both the riser and the opening for stripper vapor.

As previously discussed, it is preferred to send stripper vapor back between the primary and secondary cyclones.

It is possible to send stripper vapor to a point downstream of the secondary reactor cyclone. This may increase catalyst entrainment into the FCC main column.

A small cyclone(s) could be added to the snorkel line if it were desired to remove entrained catalyst. This will be especially important if the entrained catalyst in the gas flowing through the snorkel is likely to cause difficulties in downstream processing units.

I claim:

1. An apparatus for fluidized catalytic cracking of hydrocarbon feed comprising:
   - (a.) a reactor vessel;
   - (b.) an elongated reactor having an inlet section comprising an inlet for said hydrocarbon feed and an inlet for a source of hot regenerated catalytic cracking catalyst and an outlet section having an outlet discharging catalytically cracked products and spent catalyst into said reactor vessel;
   - (c.) a closed cyclone separation means within said reactor vessel receiving cracked products and spent catalyst discharged from said elongated reactor and separating them into a catalyst rich phase which is discharged down into a catalyst stripper within said reactor vessel and a cracked product phase with a reduced content of catalyst which is discharged from said closed cyclone via a cyclone vapor outlet;
   - (d.) a spent catalyst stripper means in a lower portion of said reactor vessel, receiving spent catalyst discharged from said closed cyclone, having a stripping gas inlet in a lower portion of said catalyst stripper, a stripper vapor outlet in an upper portion of said stripper means which is in open fluid communication with said reactor vessel and a stripped catalyst outlet in a lower portion of said stripper;
   - (g.) a stripper vapor transfer conduit having an inlet in a lower portion thereof in open fluid communication with said reactor vessel at an elevation below said closed cyclone and above said catalyst stripper vapor outlet, and an outlet in an upper portion of said transfer conduit fluidly connected with said closed cyclone separator or a line fluidly connective with said cyclone vapor outlet;
   - (h.) a catalyst regenerator means receiving stripped catalyst discharged from said catalyst stripper having an inlet for an oxygen-containing regeneration gas, an outlet for flue gas produced during catalyst regeneration and an outlet for regenerated catalyst connective with said inlet portion of said elongated reactor,
   - (i.) wherein said cyclone separation means comprises at least one primary cyclone connected to said reactor discharging solids down into said stripper via a catalyst standpipe and said stripper vapor transfer conduit is at least partially contained within said catalyst standpipe and said transfer conduit outlet is within said primary cyclone.

2. The apparatus of claim 1 wherein said elongated reactor is a riser reactor.

3. The apparatus of claim 1 wherein said closed cyclone separation means comprises at least one primary cyclone connected to said reactor, said primary cyclone discharging said catalyst rich phase down into said stripper via a primary cyclone catalyst standpipe and discharging vapor via a primary cyclone vapor conduit into at least one secondary cyclone, and said outlet of said stripper vapor transfer conduit is sealingly affixed to said primary cyclone vapor conduit.

4. The apparatus of claim 1 wherein said cyclone separation means comprises at least one primary cyclone connected to said reactor discharging said catalyst rich phase down into said stripper via a catalyst standpipe and discharging vapor via a primary cyclone vapor conduit into at least one secondary cyclone, and wherein said stripper vapor transfer conduit has an outlet connective with said primary cyclone vapor conduit discharging into said secondary cyclone.

5. An apparatus for fluidized catalytic cracking of hydrocarbon feed comprising:
   - (a.) a reactor vessel;
   - (b.) a riser reactor having inlets in a lower portion thereof for said hydrocarbon feed and for a source of hot regenerated catalytic cracking catalyst and an outlet in an upper portion thereof discharging catalytically cracked products and spent catalyst into an upper portion of said reactor vessel;
   - (c.) a closed cyclone separation means within said reactor vessel receiving cracked products and spent catalyst discharged from said riser reactor and separating them into a catalyst rich phase which is discharged down a standpipe into a catalyst stripper within said reactor vessel and a cracked product phase with a reduced content of catalyst which is discharged from said closed cyclone via a cyclone vapor outlet;

(d.) a spent catalyst stripper means in a lower portion of said reactor vessel, receiving spent catalyst discharged from said closed cyclone, having a stripping gas inlet in a lower portion of said catalyst stripper, a stripper vapor outlet in an upper portion of said stripper means which is in open fluid communication with said reactor vessel and a stripped catalyst outlet in a lower portion of said stripper;

(g.) a stripper vapor transfer conduit having an inlet in a lower portion thereof in open fluid communication with said reactor vessel at an elevation below said closed cyclone and above said catalyst stripper vapor outlet, and an outlet in an upper portion of said transfer conduit fluidly connected with said closed cyclone separator or a line fluidly connective with said cyclone vapor outlet;

(h.) a catalyst regenerator means receiving stripped catalyst discharged from said catalyst stripper having an inlet for an oxygen-containing regeneration gas, an outlet for flue gas produced during catalyst regeneration and an outlet for regenerated catalyst connective with said inlet portion of said riser reactor, (i.) wherein said stripper vapor transfer conduit is attached to said standpipe.

6. The apparatus of claim 5 wherein said standpipe discharges down into said catalyst stripper and said standpipe is sealed by immersion in said stripper.

7. The apparatus of claim 5 wherein said standpipe terminates at an elevation above said catalyst stripper and said standpipe is sealed with a flapper valve.

8. The apparatus of claim 5 wherein said stripper vapor transfer conduit is within and axially aligned with said standpipe.

9. The apparatus of claim 5 wherein multiple primary cyclones, in parallel, are used to separate spent catalyst and cracked product discharged from said riser reactor, and multiple stripper standpipes discharge a spent catalyst phase down into said catalyst stripper.

* * * * *